（12） United States Patent
Chen et al.

(10) Patent No.: US 8,892,824 B2
(45) Date of Patent: Nov. 18, 2014

(54) STORE-OPERATE-COHERENCE-ON-VALUE (75) Inventors: Dong Chen, Croton-on-Hudson, NY (US); Philip Heidelberger, Cortlandt Manor, NY (US); Sameer Kumar, White Plains, NY (US); Martin Ohmacht, Yorktown Heights, NY (US); Burkhard Steinmacher-Burow, Esslingen (DE)

(73) Assignee: International Business Machines Corporation, Armonk, NY (US)

( * ) Notice: Subject to any disclaimer, the term of this patent is extended or adjusted under 35 U.S.C. 154(b) by 566 days.

(21) Appl. No.: 12/986,652

(22) Filed: Jan. 7, 2011

(65) Prior Publication Data
US 2011/0179229 A1 Jul. 21, 2011

Related U.S. Application Data

(60) Provisional application No. 61/295,669, filed on Jan. 15, 2010.

(51) Int. Cl.
*G06F 12/02* (2006.01)
*G06F 9/30* (2006.01)
*G06F 12/08* (2006.01)
*G06F 9/38* (2006.01)

(52) U.S. Cl.
CPC ........ *G06F 12/0815* (2013.01); *G06F 9/30072* (2013.01); *G06F 9/30043* (2013.01); *G06F 9/30087* (2013.01); *Y02B 60/1225* (2013.01); *G06F 9/3834* (2013.01)
USPC ....................................................... 711/141

(58) Field of Classification Search
USPC ....................................................... 711/141
See application file for complete search history.

(56) References Cited

U.S. PATENT DOCUMENTS 6,529,990 B1 * 3/2003 Kruse et al. ................... 710/310
2006/0230237 A1 * 10/2006 Sakamoto ..................... 711/141

* cited by examiner

*Primary Examiner* — Kenneth Lo
(74) *Attorney, Agent, or Firm* — Scully, Scott, Murphy & Presser, P.C.; Daniel P. Morris, Esq.

(57) ABSTRACT

A system, method and computer program product for performing various store-operate instructions in a parallel computing environment that includes a plurality of processors and at least one cache memory device. A queue in the system receives, from a processor, a store-operate instruction that specifies under which condition a cache coherence operation is to be invoked. A hardware unit in the system runs the received store-operate instruction. The hardware unit evaluates whether a result of the running the received store-operate instruction satisfies the condition. The hardware unit invokes a cache coherence operation on a cache memory address associated with the received store-operate instruction if the result satisfies the condition. Otherwise, the hardware unit does not invoke the cache coherence operation on the cache memory device.

15 Claims, 9 Drawing Sheets

| Optional Field 520 | Opcode 505 | Logical Address 510 | Operand Value 515 |

STORE-OPERATE-COHERENCE-ON-VALUE

CROSS-REFERENCE TO RELATED APPLICATIONS

The present application claims priority to U.S. Provisional Application Ser. No. 61/295,669, filed Jan. 15, 2010, which is herein incorporated by reference in its entirety. The present invention is also related to the following commonly-owned, co-pending United States Patent Applications filed on even date herewith, the entire contents and disclosure of each of which is expressly incorporated by reference herein as if fully set forth herein. Application Ser. No. 12/684,367, filed on Jan. 8, 2010, for "USING DMA FOR COPYING PERFORMANCE COUNTER DATA TO MEMORY"; application Ser. No. 12/684,172, filed on Jan. 8, 2010, for "HARDWARE SUPPORT FOR COLLECTING PERFORMANCE COUNTERS DIRECTLY TO MEMORY"; application Ser. No. 12/684,190, filed on Jan. 8, 2010, for "HARDWARE ENABLED PERFORMANCE COUNTERS WITH SUPPORT FOR OPERATING SYSTEM CONTEXT SWITCHING"; application Ser. No. 12/684,496, filed on Jan. 8, 2010, for "HARDWARE SUPPORT FOR SOFTWARE CONTROLLED FAST RECONFIGURATION OF PERFORMANCE COUNTERS"; application Ser. No. 12/684,429, filed on Jan. 8, 2010, for "HARDWARE SUPPORT FOR SOFTWARE CONTROLLED FAST MULTIPLEXING OF PERFORMANCE COUNTERS"; application Ser. No. 12/697,799, filed on Feb. 1, 2010, for "CONDITIONAL LOAD AND STORE IN A SHARED CACHE"; application Ser. No. 12/684,738, filed on Jan. 8, 2010, for "DISTRIBUTED PERFORMANCE COUNTERS"; application Ser. No. 61/261,269, filed on Nov. 13, 2009, for "LOCAL ROLLBACK FOR FAULT-TOLERANCE IN PARALLEL COMPUTING SYSTEMS"; application Ser. No. 12/684,860, filed on Jan. 8, 2010 for "PAUSE PROCESSOR HARDWARE THREAD ON PIN"; application Ser. No. 12/684,174, filed on Jan. 8, 2010, for "PRECAST THERMAL INTERFACE ADHESIVE FOR EASY AND REPEATED, SEPARATION AND REMATING"; application Ser. No. 12/684,184, filed on Jan. 8, 2010, for "ZONE ROUTING IN A TORUS NETWORK"; application Ser. No. 12/684,852, filed on Jan. 8, 2010, for "PROCESSOR RESUME UNIT"; application Ser. No. 12/684,642, filed on Jan. 8, 2010, for "OPTIMIZING TLB ENTRIES FOR MIXED PAGE SIZE STORAGE IN CONTIGUOUS MEMORY"; application Ser. No. 12/684,804, filed on Jan. 8, 2010, for "DISTRIBUTED TRACE USING CENTRAL PERFORMANCE COUNTER MEMORY"; application Ser. No. 61/293,237, Jan. 8, 2010, for "ORDERING OF GUARDED AND UNGUARDED STORES FOR NO-SYNC I/O"; application Ser. No. 12/693,972, filed on Jan. 26, 2010, for "DISTRIBUTED PARALLEL MESSAGING FOR MULTIPROCESSOR SYSTEMS"; application Ser. No. 12/688,747, filed on Jan. 15, 2010, for "SUPPORT FOR NON-LOCKING PARALLEL RECEPTION OF PACKETS BELONGING TO THE SAME RECEPTION FIFO"; application Ser. No. 12/688,773, filed on Jan. 15, 2010, for "OPCODE COUNTING FOR PERFORMANCE MEASUREMENT"; application Ser. No. 61/293,611, filed on Jan. 8, 2010, for "A MULTI-PETASCALE HIGHLY EFFICIENT PARALLEL SUPERCOMPUTER"; application Ser. No. 12/984,252, filed on Jan. 4, 2011, for "CACHE WITHIN A CACHE"; application Ser. No. 61/299,911, filed on Jan. 29, 2010, for "SPECULATION AND TRANSACTION IN A SYSTEM SPECULATION AND TRANSACTION SUPPORT IN L2 L1 SUPPORT FOR SPECULATION/TRANSACTIONS IN A2 PHYSICAL ALIASING FOR THREAD LEVEL SPECULATION MULTIFUNCTIONING L2 CACHE CACHING MOST RECENT DIRECTORY LOOK UP AND PARTIAL CACHE LINE SPECULATION SUPPORT"; application Ser. No. 12/984,308, filed on Jan. 4, 2011, for "EVICT ON WRITE, A MANAGEMENT STRATEGY FOR A PREFETCH UNIT AND/OR FIRST LEVEL CACHE IN A MULTIPROCESSOR SYSTEM WITH SPECULATIVE EXECUTION"; application Ser. No. 12/984,329, filed on Jan. 4, 2011, for "PHYSICAL ALIASING FOR THREAD LEVEL SPECULATION WITH A SPECULATION BLIND CACHE"; application Ser. No. 61/293,552, filed on Jan. 8, 2010, for "LIST BASED PREFETCH"; application Ser. No. 12/684,693, filed on Jan. 8, 2010, for "PROGRAMMABLE STREAM PREFETCH WITH RESOURCE OPTIMIZATION"; application Ser. No. 61/293,494, filed on Jan. 8, 2010, for "FLASH MEMORY FOR CHECKPOINT STORAGE"; application Ser. No. 61/293,476, filed on Jan. 8, 2010, for "NETWORK SUPPORT FOR SYSTEM INITIATED CHECKPOINTS"; application Ser. No. 61/293,554, filed on Jan. 8, 2010, for "TWO DIFFERENT PREFETCH COMPLEMENTARY ENGINES OPERATING SIMULTANEOUSLY"; application Ser. No. 12/697,015, filed on Jan. 29, 2010, for "DEADLOCK-FREE CLASS ROUTES FOR COLLECTIVE COMMUNICATIONS EMBEDDED IN A MULTIDIMENSIONAL TORUS NETWORK"; application Ser. No. 61/293,559, filed on Jan. 8, 2010 for "IMPROVING RELIABILITY AND PERFORMANCE OF A SYSTEM-ON-A-CHIP BY PREDICTIVE WEAR-OUT BASED ACTIVATION OF FUNCTIONAL COMPONENTS"; application Ser. No. 61/293,569, filed on Jan. 8, 2010, for "A SYSTEM AND METHOD FOR IMPROVING THE EFFICIENCY OF STATIC CORE TURN OFF IN SYSTEM ON CHIP (SoC) WITH VARIATION"; application Ser. No. 12/697,043, filed on Jan. 29, 2010, for "IMPLEMENTING ASYNCHRONOUS COLLECTIVE OPERATIONS IN A MULTI-NODE PROCESSING SYSTEM"; application Ser. No. 12/697,175, filed on Jan. 29, 2010, for "I/O ROUTING IN A MULTIDIMENSIONAL TORUS NETWORK"; application Ser. No. 12/684,287, filed on Jan. 8, 2010, for ARBITRATION IN CROSSBAR INTERCONNECT FOR LOW LATENCY; application Ser. No. 12/684,630, filed on Jan. 8, 2010, for EAGER PROTOCOL ON A CACHE PIPELINE DATAFLOW; application Ser. No. 12/723,277, filed on Mar. 12, 2010, for EMBEDDED GLOBAL BARRIER AND COLLECTIVE IN A TORUS NETWORK; application Ser. No. 61/293,499, filed on Jan. 8, 2010, for GLOBAL SYNCHRONIZATION OF PARALLEL PROCESSORS USING CLOCK PULSE WIDTH MODULATION; application Ser. No. 61/293,266, filed on Jan. 8, 2010, for IMPLEMENTATION OF MSYNC; application Ser. No. 12/796,389, filed on Jun. 8, 2010 for BALANCING WORKLOAD IN A MULTIPROCESSOR SYSTEM RESPONSIVE TO PROGRAMMABLE ADJUSTMENTS IN A SYNCHRONIZATION INSTRUCTION; application Ser. No. 12/696,817, filed on Jan. 29, 2010, for HEAP/STACK GUARD PAGES USING A WAKEUP UNIT; application Ser. No. 61/293,603, filed on Jan. 8, 2010, for MECHANISM OF SUPPORTING SUB-COMMUNICATOR COLLECTIVES WITH O(64) COUNTERS AS OPPOSED TO ONE COUNTER FOR EACH SUB-COMMUNICATOR; and application Ser. No. 61/299,918, filed on Jan. 29, 2010, for REPRODUCIBILITY IN A MULTIPROCESSOR SYSTEM.

GOVERNMENT CONTRACT

This invention was Government supported under Contract No. B554331 awarded by the Department of Energy. The Government has certain rights in this invention.

BACKGROUND

The present application generally relates to a parallel computing environment. More particularly, the present application relates to invoking a cache coherence operation at a cache memory device in the parallel computing environment.

A multi-threaded computer application, e.g., a cache coherent multiprocessor, may require cache coherence operations in memory devices and memory management structures to make copies of data in memory devices consistent and coherent (e.g., having same data value across copies in a main memory and cache memories regarding a memory location at a particular logical address). Such a thread(s) may refer to a computer processor or other processing devices (e.g., a network adaptor) which can read or write to a (cache or main) memory location. When a thread or other actions change the value of a memory location in one memory device, that device then invokes cache coherence operations to other memory devices in order to maintain cache coherence across the memory devices. Those cache coherence operations include, but are not limited to: invalidating a cache line, updating a cache line, etc. Morrow et al., "Methods and apparatus for low intrusion snoop invalidation," U.S. Patent Application Publication No. 20100211744, filed Feb. 19, 2009, wholly incorporated by reference, describes cache coherence operations in detail. Known examples of cache coherence protocols include, but are not limited to: MSI (Modified, Shared and Invalid) protocol, MESI (Modified, Exclusive, Shared and Invalid) protocol, MOESI (Modified, Owned, Exclusive, Shared and Invalid) protocol, MERSI protocol (Modified, Exclusive, Read Only or Recent, Shared and Invalid) protocol, MESIF protocol (Modified, Exclusive, Shared, Invalid, Forward) protocol, Write-once protocol, Firefly protocol, and Dragon protocol.

A traditional store-operate instruction reads from, modifies, and writes to a memory location as an atomic operation. The atomic property allows the store-operate instruction to be used as a synchronization primitive across multiple threads. For example, the store-and instruction atomically reads data in a memory location, performs a bitwise logical-and operation of data (i.e., data described with the store-add instruction) and the read data, and writes the result of the logical-and operation into the memory location. The term store-operate instruction also includes the fetch-and-operate instruction (i.e., an instructions that returns a data value from a memory location and then modifies the data value in the memory location). An example of a traditional fetch-and-operate instruction is the fetch-and-increment instruction (i.e., an instruction that returns a data value from a memory location and then increments the value at that location).

In a multi-threaded environment, the use of store-operate instructions may improve application performance (e.g., better throughput, etc.). Because atomic operations are performed within a memory unit, the memory unit can satisfy a very high rate of store-operate instructions, even if the instructions are to a single memory location. For example, a memory system of IBM® Blue Gene®/Q computer can perform a store-operate instruction every 4 processor cycles. Since a store-operate instruction modifies the data value at a memory location, it traditionally invokes a memory coherence operation to other memory devices. For example, on the IBM® Blue Gene®/Q computer, a store-operate instruction can invoke a memory coherence operation on up to 15 level-1 (L1) caches (i.e., local caches). A high rate (e.g., every 4 processor cycles) of traditional store-operate instructions thus causes a high rate (e.g., every 4 processor cycles) of memory coherence operations which can significantly occupy computer resources and thus reduce application performance.

SUMMARY OF THE INVENTION

The present disclosure describes a method, system and computer program product for performing various store-operate instructions in a parallel computing system that reduces the number of cache coherence operations and thus increases application performance.

In one embodiment, there is provided a system for performing various store-operate instructions in a parallel computing environment that includes a plurality of processors and at least one cache memory device. A queue in the system receives, from a processor, a store-operate instruction that specifies under which condition a cache coherence operation is to be invoked. A hardware unit in the system runs the received store-operate instruction. The hardware unit evaluates whether a result of the running the received store-operate instruction satisfies the condition. The hardware unit invokes a cache coherence operation on a cache memory address associated with the received store-operate instruction if the result satisfies the condition. Otherwise, the hardware unit does not invoke the cache coherence operation on the cache memory device.

In a further embodiment, the condition is a particular value implicit or explicit in the received instruction.

In a further embodiment, the received instruction specifies the particular value as zero.

In a further embodiment, the parallel computing environment includes a network in which packets are communicated out-of-order among the processors and delivered out-of-order to a network adaptor, a counter that decrements a counter value upon receiving a packet, and the network adaptor that issues a StoreAddCoherenceOnZero instruction, at least one cache memory device in responding to the issued StoreAddCoherenceOnZero instruction to perform a cache coherence operation only when the counter value becomes zero and making the cache memory device not perform a cache coherence operation on an arrival of each packet.

In a further embodiment, the processor issues a FetchAndDecrementCoherenceOnZero instruction to implement a barrier which does not invoke a cache coherence operation on an arrival of each thread into the barrier.

In a further embodiment, if the received instruction is a StoreOperateCoherenceOnPredecessor or FetchAndOperateCoherenceOnPredecessor instruction, the hardware unit retrieves another value, from the cache memory device, in a preceding memory location of the cache memory address corresponding to the logical address. The hardware unit evaluates whether the result is equal to the retrieved value. The hardware unit determines that the condition is true if the result is equal to the retrieved value. Otherwise, the hardware unit determines that the condition is false. The hardware unit invokes the cache coherence operation only if the condition is true.

In a further embodiment, if the received instruction is a StoreOperateCoherenceThroughZero or FetchAndOperateCoherenceThroughZero instruction, the hardware unit evaluates a sign of the result and a sign of an original data value in the cache memory address. The hardware unit determines that the condition is true if the sign of the result is an opposite of the sign of the original data value. Otherwise, the hardware unit determines that the condition is false. The hardware unit invokes the cache coherence operation only if the condition is true.

In a further embodiment, the received instruction is one or more of: StoreOperateCoherenceOnValue instruction, StoreOperateCoherenceOnPredecessor instruction, StoreOperateCoherenceThroughZero instruction, FetchAndOperateCoherenceOnValue instruction, FetchAndOperateCoherenceOnPredecessor instruction, and FetchAndOperateCoherenceThroughZero instruction. Each received instruction further specifies one or more operations of StoreAdd, StoreMin, StoreMax, Bitwise StoreAnd, Bitwise StoreOr, Bitwise StoreXor, FetchAndIncrement, FetchAndDecrement, and FetchAndClear.

BRIEF DESCRIPTION OF THE DRAWINGS

The accompanying drawings are included to provide a further understanding of the present invention, and are incorporated in and constitute a part of this specification.

DETAILED DESCRIPTION

In one embodiment, there are provided various store-operate instructions available to a computing device to reduce the number of memory coherence operations in a parallel computing environment that includes a plurality of processors, at least one cache memory and at least one main memory. These various provided store-operate instructions are variations of a traditional store-operate instruction that atomically modify the data (e.g., bytes, bits, etc.) at a (cache or main) memory location. These various provided store-operate instructions include, but are not limited to: StoreOperateCoherenceOnValue instruction, StoreOperateCoherenceThroughZero instruction and StoreOperateCoherenceOnPredecessor instruction. In one embodiment, the term store-operate instruction(s) also includes the fetch-and-operate instruction(s). These various provided fetch-and-operate instructions thus also include, but are not limited to: FetchAndOperateCoherenceOnValue instruction, FetchAndOperateCoherenceThroughZero instruction and FetchAndOperateCoherenceOnPredecessor instruction.

In one aspect, a StoreOperateCoherenceOnValue instruction is provided that improves application performance in a parallel computing environment (e.g., IBM® Blue Gene® computing devices L/P, etc. such as described in herein incorporated U.S. Provisional Application Ser. No. 61/295,669), by reducing the number of cache coherence operations invoked by a functional unit (e.g., a functional unit 120 in FIG. 1). The Store OperateCoherenceOnValue instruction invokes a cache coherence operation only when the result of a store-operate instruction is a particular value or set of values. The particular value may be given by the instruction issued from a processor in the parallel computing environment. The StoreOperateCoherenceThroughZero instruction invokes a cache coherence operation only when data (e.g., a numerical value) in a (cache or main) memory location described in the StoreAddCoherenceThroughZero instruction changes from a positive value to a negative value, or vice versa. The StoreOperateCoherenceOnPredecessor instruction invokes a cache coherence operation only when the result of a StoreOperateCoherenceOnPredecessor instruction is equal to data (e.g., a numerical value) stored in a preceding memory location of a logical memory address described in the StoreOperateCoherenceOnPredecessor instruction. These instructions are described in detail in conjunction with FIGS. 2A-4B.

The FetchAndOperateCoherenceOnValue instruction invokes a cache coherence operation only when a result of the fetch-and-operate instruction is a particular value or set of values. The particular value may be given by the instruction issued from a processor in the parallel computing environment. The FetchAndOperateCoherenceThroughZero instruction invokes a cache coherence operation only when data (e.g., a numerical value) in a (cache or main) memory location described in the fetch-and-operate instruction changes from a positive value to a negative value, or vice versa. The FetchAndOperateCoherenceOnPredecessor instruction invokes a cache coherence operation only when the result of a fetch-and-operate instruction (i.e., the read data value in a memory location described in the fetch-and-operate instruction) is equal to particular data (e.g., a particular numerical value) stored in a preceding memory location of a logical memory address described in the fetch-and-operate instruction.

Figure 1:
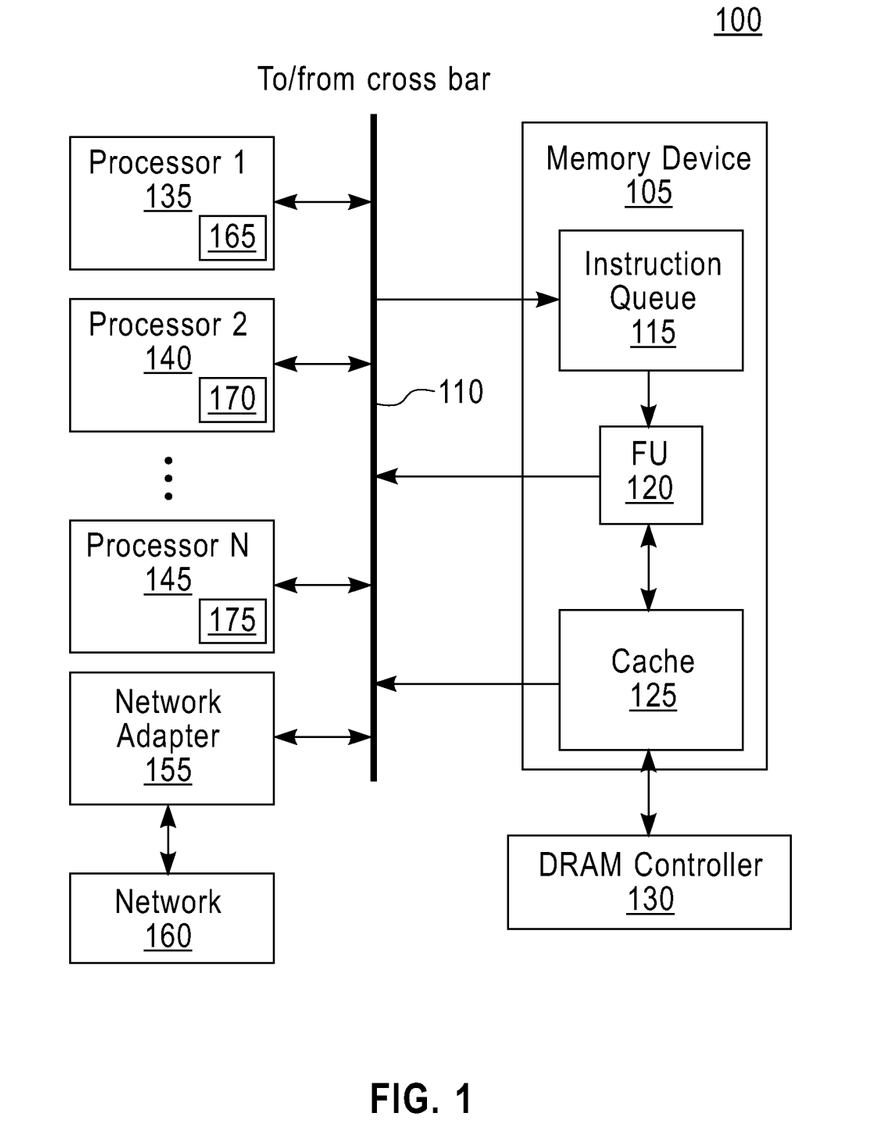
FIG. 1 illustrates a portion of a parallel computing environment 100 employing the system and method of the present invention in one embodiment.

FIG. 1 illustrates a portion of a parallel computing environment 100 employing the system and method of the present invention in one embodiment. The parallel computing environment may include a plurality of processors (Processor 1 (135), Processor 2 (140), . . . , and Processor N (145)). In one embodiment, these processors are heterogeneous (e.g., a processor is IBM® PowerPC®, another processor is Intel® Core™). In another embodiment, these processors are homogeneous (i.e., identical each other). A processor may include at least one local cache memory device. For example, a processor 1 (135) includes a local cache memory device 165. A processor 2 (140) includes a local cache memory device 170.

A processor N (145) includes a local cache memory device 175. In one embodiment, the term processor may also refer to a DMA engine or a network adaptor 155 or similar equivalent units or devices. One or more of these processors may issue load or store instructions. These load or store instructions are transferred from the issuing processors, e.g., through a cross bar switch 110, to an instruction queue 115 in a memory or cache unit 105. A functional unit (FU) 120 fetches these instructions from the instruction queue 115, and runs these instructions. To run one or more of these instructions, the FU 120 may retrieve data stored in a cache memory 125 or in a main memory (not shown) via a main memory controller 130. Upon completing the running of the instructions, the FU 120 may transfer outputs of the run instructions to the issuing processor or network adaptor via the network 110 and/or store outputs in the cache memory 125 or in the main memory (not shown) via the main memory controller 130. The main memory controller 130 is a traditional memory controller that manages data flow between the main memory device and other components (e.g., the cache memory device 125, etc.) in the parallel computing environment 100.

Figure 2A:
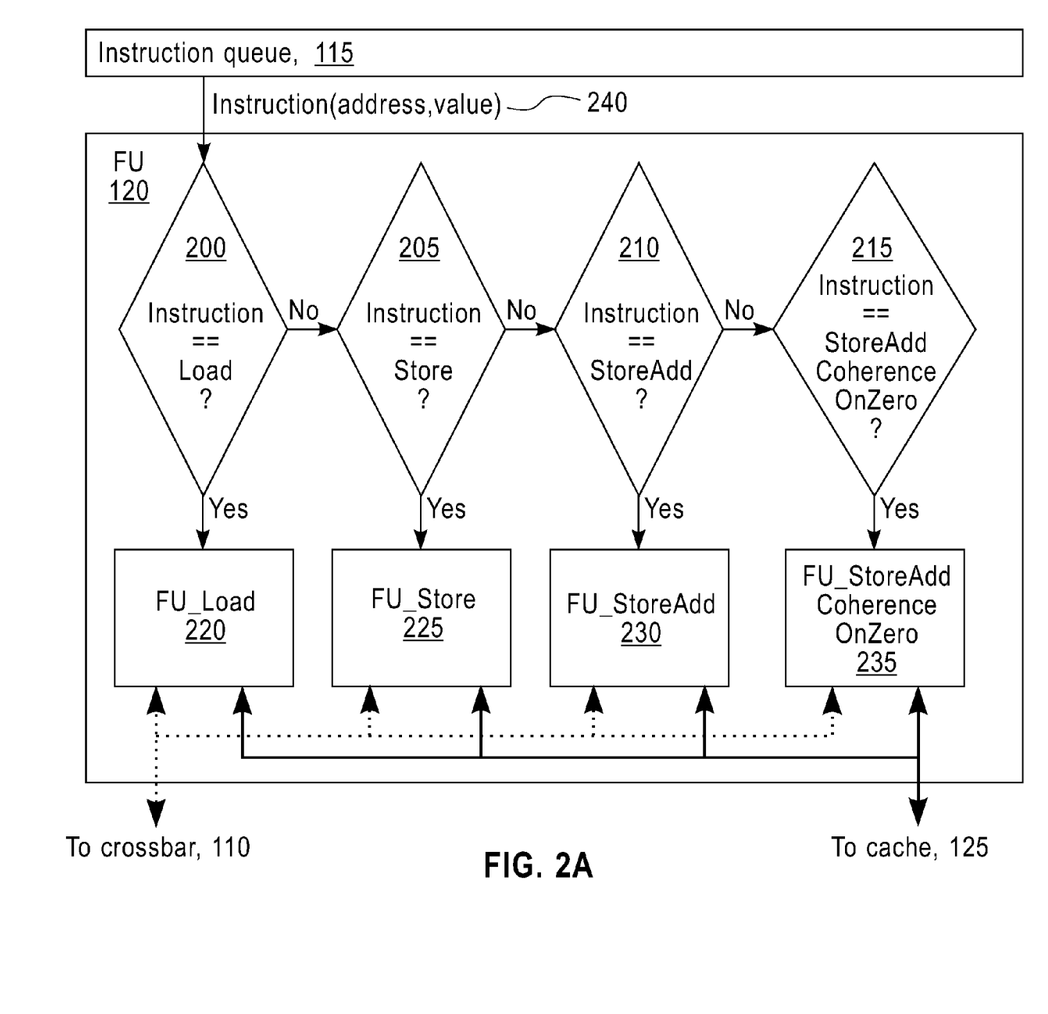
FIGS. 2A-2B illustrate a system diagram for implementing "StoreOperateCoherenceOnZero" instruction in one embodiment.
Figure 2B:
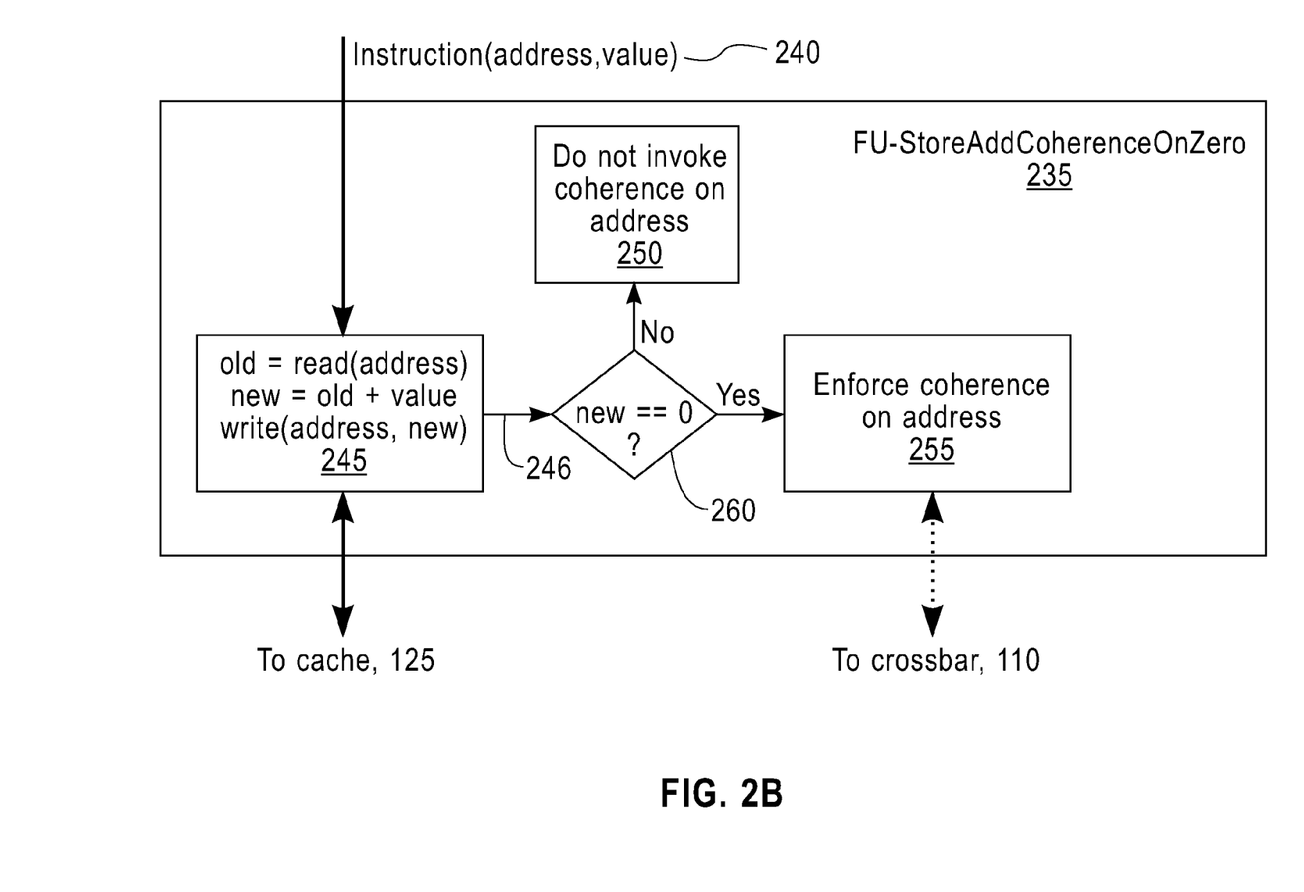
Figure 5:
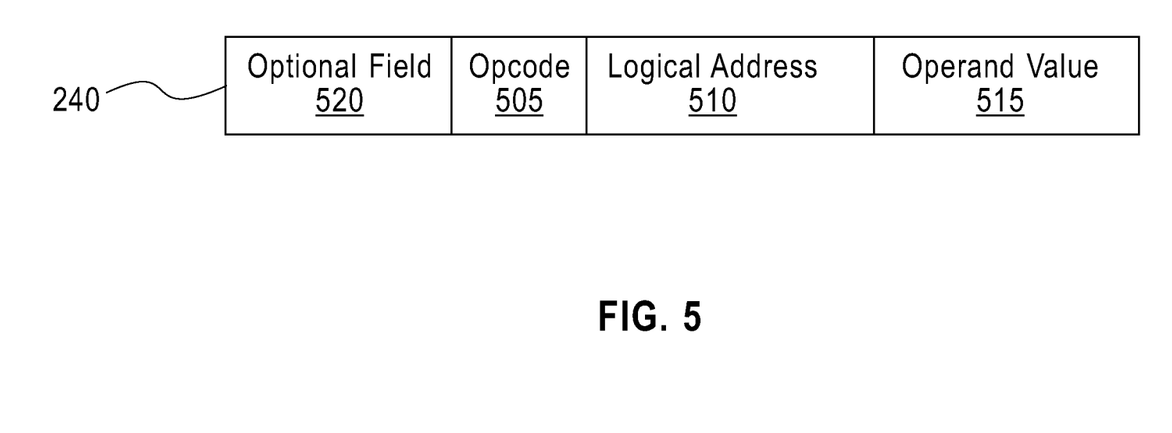
FIG. 5 illustrates an exemplary instruction in one embodiment.

FIGS. 2A-2B illustrates operations of the FU 120 to run the StoreOperateCoherenceOnValue instruction in one embodiment. The FU 120 fetches an instruction 240 from the instruction queue 115. FIG. 5 illustrates composition of the instruction 240 in one embodiment. The instruction 240 includes an Opcode 505 specifying what is to be performed by the FU 120 (e.g., reading data from a memory location, storing data to a memory location, store-add, store, max or other store-operate instruction, fetch-and-increment, fetch-and-decrement or other fetch-and-operate instruction, etc.). The Opcode 505 may include further information e.g., the width of an operand value 515. The instruction 240 also includes a logical address 510 specifying a memory location from which data is to be read and/or stored. In the case of a store instruction, the instruction 240 includes the operand value 515 to be stored to the memory location. Similarly, in the case of a store-operate instruction, the instruction 240 includes the operand value 515 to be used in an operation with an existing memory value with an output value to be stored to the memory location. Similarly, in the case of a fetch-and-operate instructions, the instruction 240 may include an operand value 515 to be used in an operation with the existing memory value with an output value to be stored to the memory location. Alternatively, the operand value 515 may correspond to a unique identification number of a register. The instruction 240 may also include an optional field 520 whose value is used by a store-operate or fetch-and-operate instruction to determine if a cache coherence operation should be invoked. In one embodiment, the instruction 240, including the optional field 520 and the Opcode 505 and the logical address 510, but excluding the operand value 515, has a width of 32 bits or 64 bits or other widths. The operand value 515 typically has widths of 1 byte, 4 byte, 8 byte, 16 byte, 32 byte, 64 byte, 128 byte or other widths.

In one embodiment, the instruction 240 specifies at least one condition under which a cache coherence operation is invoked. For example, the condition may specifies a particular value, e.g., zero.

Upon fetching the instruction 240 from the instruction queue 115, the FU 120 evaluates 200 whether the instruction 240 is a load instruction, e.g., by checking whether the Opcode 505 of the instruction 240 indicates that the instruction 240 is a load instruction. If the instruction 240 is a load instruction, the FU 120 reads 220 data stored in a (cache or main) memory location corresponding to the logical address 510 of the instruction 240, and uses the crossbar 110 to return the data to the issuing processor. Otherwise, the FU 120 evaluates 205 whether the instruction 240 is a store instruction, e.g., by checking whether the Opcode 505 of the instruction 240 indicates that the instruction 240 is a store instruction. If the instruction 240 is a store instruction, the FU 120 transfers 225 the operand value 515 of the instruction 240) to a (cache or main) memory location corresponding to the logical address 510 of the instruction 240. Because a store instruction changes the value at a memory location, the FU 120 invokes 225, e.g. via cross bar 110, a cache coherence operation on other memory devices such as L1 caches 165-175 in processors 135-145. Otherwise, the FU 120 evaluates 210 whether the instruction 240 is a store-operate or fetch-and-operate instruction, e.g., by checking whether the Opcode 505 of the instruction 240 indicates that the instruction 240 is a store-operate or fetch-and-operate instruction.

If the instruction 240 is a store-operate instruction, the FU 120 reads 230 data stored in a (cache or main) memory location corresponding to the logical address 510 of the instruction 240, modifies 230 the read data with the operand value 515 of the instruction, and writes 230 the result of the modification to the (cache or main) memory location corresponding to the logical address 510 of the instruction. Alternatively, the FU modifies 230 the read data with data stored in a register (e.g., accumulator) corresponding to the operand value 515, and writes 230 the result to the memory location. Because a store-operate instruction changes the value at a memory location, the FU 120 invokes 225, e.g. via cross bar 110, a cache coherence operation on other memory devices such as L1 caches 165-175 in processors 135-145.

If the instruction 240 is a fetch-and-operate instruction, the FU 120 reads 230 data stored in a (cache or main) memory location corresponding to the logical address 510 of the instruction 240 and return, via the crossbar 110, the data to the issuing processor. The FU then modifies 230 the data, e.g., with an operand value 515 of the instruction 240, and writes 230 the result of the modification to the (cache or main) memory location. Alternatively, the FU modifies 230 the data stored in the (cache or main) memory location, e.g., with data stored in a register (e.g., accumulator) corresponding to the operand value 515, and writes the result to the memory location. Because a fetch-and-operate instruction changes the value at a memory location, the FU 120 invokes 225, e.g. via cross bar 110, a cache coherence operation on other memory devices such as L1 caches 165-175 in processors 135-145.

Otherwise, the FU 120 evaluates 215 whether the instruction 240 is a StoreOperateCoherenceOnValue instruction or FetchAndOperateCoherenceOnValue instruction, e.g., by checking whether the Opcode 505 of the instruction 240 indicates that the instruction 240 is a StoreOperateCoherenceOnValue instruction. If the instruction 240 is a StoreOperateCoherenceOnValue instruction, the FU 120 performs operations 235 which is shown in detail in FIG. 2B. The StoreOperateCoherenceOnValue instruction 235 includes the StoreOperate operation 230 described above. The StoreOperateCoherenceOnValue instruction 235 invokes a cache coherence operation on other memory devices when the condition specified in the StoreOperateCoherenceOnValue instruction is satisfied. As shown in FIG. 2B, upon receiving from the instruction queue 115 the StoreOperateCoherenceOnValue instruction, the FU 120 performs the store-operate operation described in the StoreOperateCoherenceOnValue instruction. The FU 120 evaluates 260 whether the result 246 of the store-operate operation is a particular value. In one embodiment, the particular value is implicit in the Opcode 505, for example, a value zero. In one embodiment, as shown in FIG. 5, the instruction may include an optional field 520 that specifies this particular value. The FU 240 compares the result 246 to the particular value implicit in the Opcode 505 or explicit in the optional field 520 in the instruction 240. If the result is the particular value, the FU 120 invokes 255, e.g. via cross bar 110, a cache coherence operation on other memory devices such as L1 caches 165-175 in processors 135-145. Otherwise, if the result 246 is not the particular value, the FU 120 does not invoke 250 a cache coherence operation on other memory devices.

If the instruction 240 is a FetchAndOperateCoherenceOnValue instruction, the FU 120 performs operations 235 which is shown in detail in FIG. 2B. The FetchAndOperateCoherenceOnValue instruction 235 includes the FetchAndOperate operation 230 described above. The FetchandOperateCoherenceOnValue instruction 235 invokes a cache coherence operation on other memory devices only if a condition specified in the FetchandOperateCoherenceOnValue instruction 235 is satisfied. As shown in FIG. 2B, upon receiving from the instruction queue 115 the FetchAndOperateCoherenceOnValue instruction 240, the FU 120 performs a fetch-and-operate operation described in the FetchAndOperateCoherenceOnValue instruction. The FU 120 evaluates 260 whether the result 246 of the fetch-and-operate operation is a particular value. In one embodiment, the particular value is implicit in the Opcode 505, for example, a numerical value zero. In one embodiment, as shown in FIG. 5, the instruction may include an optional field 520 that includes this particular value. The FU 240 compares the result value 246 to the particular value implicit in the Opcode 505 or explicit in the optional field 520 in the instruction 240. If the result value 246 is the particular value, the FU 120 invokes 255 e.g. via cross bar 110, a cache coherence operation on other memory devices, e.g., L1 caches 165-175 in processors 135-145. Otherwise, if the result is not the particular value, the FU 120 does not invoke 250 the cache coherence operation on other memory devices.

In one embodiment, the StoreOperateCoherenceOnValue 240 instruction described above is a StoreAddInvalidateCoherenceOnZero instruction. The value in a memory location at the logical address 510 is considered to be an integer value. The operand value 515 is also considered to be an integer value. The StoreAddInvalidateCoherenceOnZero instruction adds the operand value to the previous memory value and stores the result of the addition as a new memory value in the memory location at the logical address 510. In one embodiment, a network adapter 155 may use the StoreAddInvalidateCoherenceOnZero instruction. In this embodiment, the network adaptor 155 interfaces the parallel computing environment 100 to a network 160 which may deliver a message as out-of-order packets. A complete reception of a message can be recognized by initializing a counter to the number of bytes in the message and then having the network adaptor decrement the counter by the number of bytes in each arriving packet. The memory device 105 is of a size that allows any location in a (cache) memory device to serve as such a counter for each message. Applications on the processors 135-145 poll the counter of each message to determine if a message has completely arrived. On reception of each packet, the network adaptor can issue a StoreAddInvalidateCoherenceOnZero instruction 240 to the memory device 105. The Opcode 505 specifies the StoreAddInvalidateCoherenceOnZero instruction. The logical address 510 is that of the counter. The operand value 515 is a negative value of the number of received bytes in the packet. In this embodiment, only when the counter reaches the value 0, the memory device 105 invokes a cache coherence operation to the level-1 (L1) caches of the processors 135-145. This improves the performance of the application, since the application demands the complete arrival of each message and is uninterested in a message for which all packets have not yet arrived and only invokes the cache coherence operation only when all packets of the message arrives at the network adapter 155. By contrast, the application performance on the processors 135-145 may be decreased if the network adaptor 155 issues a traditional Store-Add instruction, since then each of the processors 135-145 would then receive and serve an unnecessary cache coherence operation upon the arrival of each packet.

In one embodiment, the FetchAndOperateCoherenceOnZero instruction 240 described above is a FetchAndDecrementCoherenceOnZero instruction. The value in a memory location at the logical address 510 is considered to be an integer value. There is no accompanying operand value 515. The FetchAndIncrementCoherenceOnZero instruction returns the previous value of the memory location and then increments the value at the memory location. In one embodiment, the processors 135-145 may use the FetchAndIncrementCoherenceOnZero instruction to implement a barrier (i.e., a point where all participating threads must arrive, and only then can the each thread proceed with its execution). The barrier uses a memory location in the memory device 105 (e.g., a shared cache memory device) as a counter. The counter is initialized with the number of threads to participate in the barrier. Each thread, upon arrival at the barrier issues a FetchAndDecrementCoherenceOnZero instruction 240 to the memory device 105. The Opcode 505 specifies the FetchAndDecrementCoherenceOnZero instruction. The memory location of the logical address 510 stores a value of the counter. The value "1" is returned by the FetchAndDecrementCoherenceOnZero instruction to the last thread arriving at the barrier and the value "0" is stored to the memory location and a cache coherence operation is invoked. Given this value "1", the last thread knows all threads have arrived at the barrier and thus the last thread can exit the barrier. For the other earlier threads to arrive at the barrier, the value "1" is not returned by the FetchAndDecrementCoherenceOnZero. So, each of these threads polls the counter for the value 0 indicating that all threads have arrived. Only when the counter reaches the value "0," the FetchAndDecrementCoherenceOnZero instruction causes the memory device 105 to invoke a cache coherence operation to the level-1 (L1) caches 165-175 of the processors 135-145. This FetchAndDecrementCoherenceOnZero instruction thus helps reduce computer resource usage in a barrier and thus helps improve the application performance. The polling mainly uses the L1-cache (local cache memory device in a processor; local cache memory devices 165-175) of each processor 134-145. By contrast, the barrier performance may be decreased if the barrier used a traditional Fetch-And-Decrement instruction, since then each of the processors 135-145 would then receive and serve an unnecessary cache coherence operation on the arrival of each thread into the barrier and thus would cause polling to communicate more with the memory device 105 and communicate less with local cache memory devices.

Figure 3A:
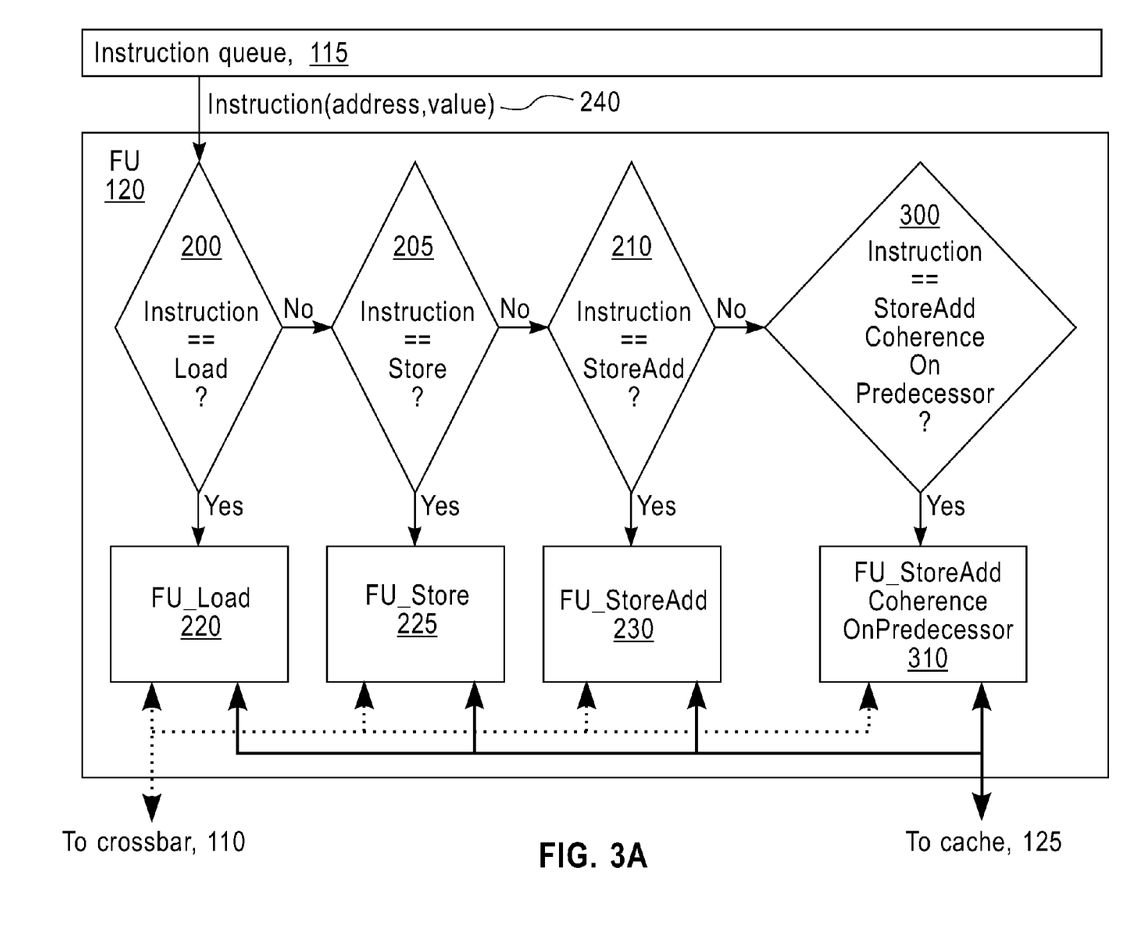
FIGS. 3A-3B illustrate a system diagram for implementing "StoreOperateCoherenceOnPredecessor" instruction in one embodiment.
Figure 3B:
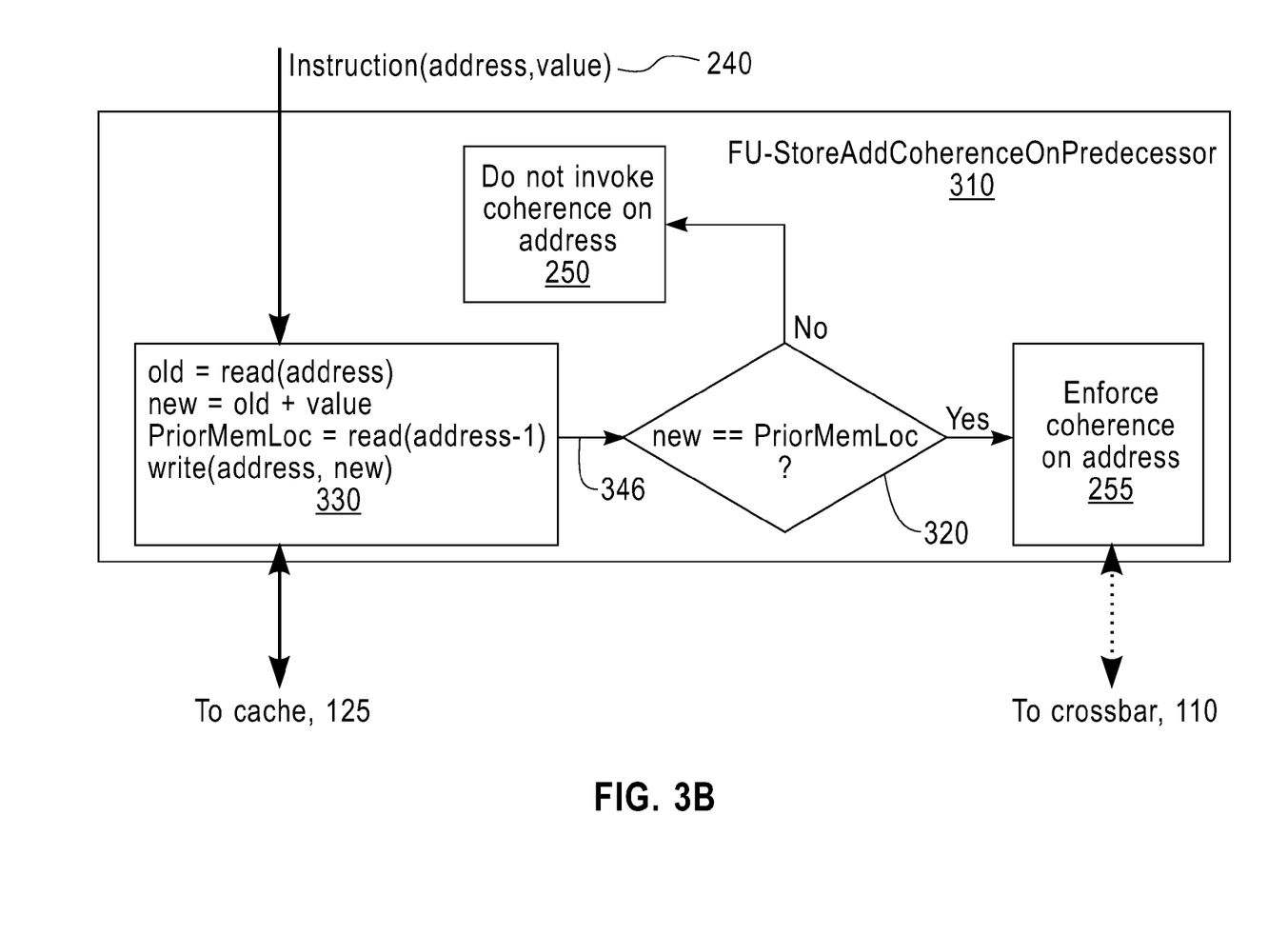

FIGS. 3A-3B illustrate operations of the FU 120 to run a StoreOperateCoherenceOnPredecessor instruction or FetchAndOperateCoherenceOnPredecessor instruction in one embodiment. FIGS. 3A-3B are similar to FIGS. 2A-2B except that the FU evaluates 300 whether the instruction 240 is the StoreOperateCoherenceOnPredecessor instruction or FetchAndOperateCoherenceOnPredecessor instruction, e.g., by checking whether the Opcode 505 of the instruction 240 indicates that the instruction 240 is a StoreOperateCoherenceOnPredecessor instruction. If the instruction 240 is a StoreOperateCoherenceOnPredecessor instruction, the FU 120 performs operations 310 which is shown in detail in FIG. 3B. The StoreOperateCoherenceOnPredecessor instruction 310 is similar to the Store OperateCoherenceOnValue operation 235 described above, except that the StoreOperateCoherenceOnPredecessor instruction 310 uses a different criterion to determine whether or not to invoke a cache coherence operation on other memory devices. As shown in FIG. 3B, upon receiving from the instruction queue 115 the StoreOperateCoherenceOnPredecessor instruction, the FU 120 performs the store-operate operation described in the StoreOperateCoherenceOnPredecessor instruction. The FU 120 evaluates 320 whether the result 346 of the store-operate operation is equal to the value stored in the preceding memory location (i.e., logical address—1). If equal, the FU 120 invokes 255, e.g. via cross bar 110, a cache coherence operation on other memory devices (e.g., local cache memories in processors 135-145). Otherwise, if the result 346 is not equal to the value in the preceding memory location, the FU 120 does not invoke 250 a cache coherence operation on other memory devices.

If the instruction 240 is a FetchAndOperateCoherenceOnPredecessor instruction, the FU 120 performs operations 310 which is shown in detail in FIG. 3B. The FetchAndOperateCoherenceOnPredecessor instruction 310 is similar to FetchAndOperateCoherenceOnValue operation 235 described above, except that the FetchAndOperateCoherenceOnPredecessor operation 310 uses a different criterion to determine whether or not to invoke a cache coherence operation on other memory devices. As shown in FIG. 3B, upon receiving from the instruction queue 115 the FetchAndOperateCoherenceOnPredecessor instruction, the FU 120 performs the fetch-and-operate operation described in the FetchAndOperateCoherenceOnPredecessor instruction. The FU 120 evaluates 320 whether the result 346 of the fetch-and-operate operation is equal to the value stored in the preceding memory location. If equal, the FU 120 invokes 255, e.g. via cross bar 110, a cache coherence operation on other memory devices (e.g., L1 cache memories in processors 135-145). Otherwise, if the result 346 is not equal to the value in the preceding memory location, the FU 120 does not invoke 250 a cache coherence operation on other memory devices.

Figure 4A:
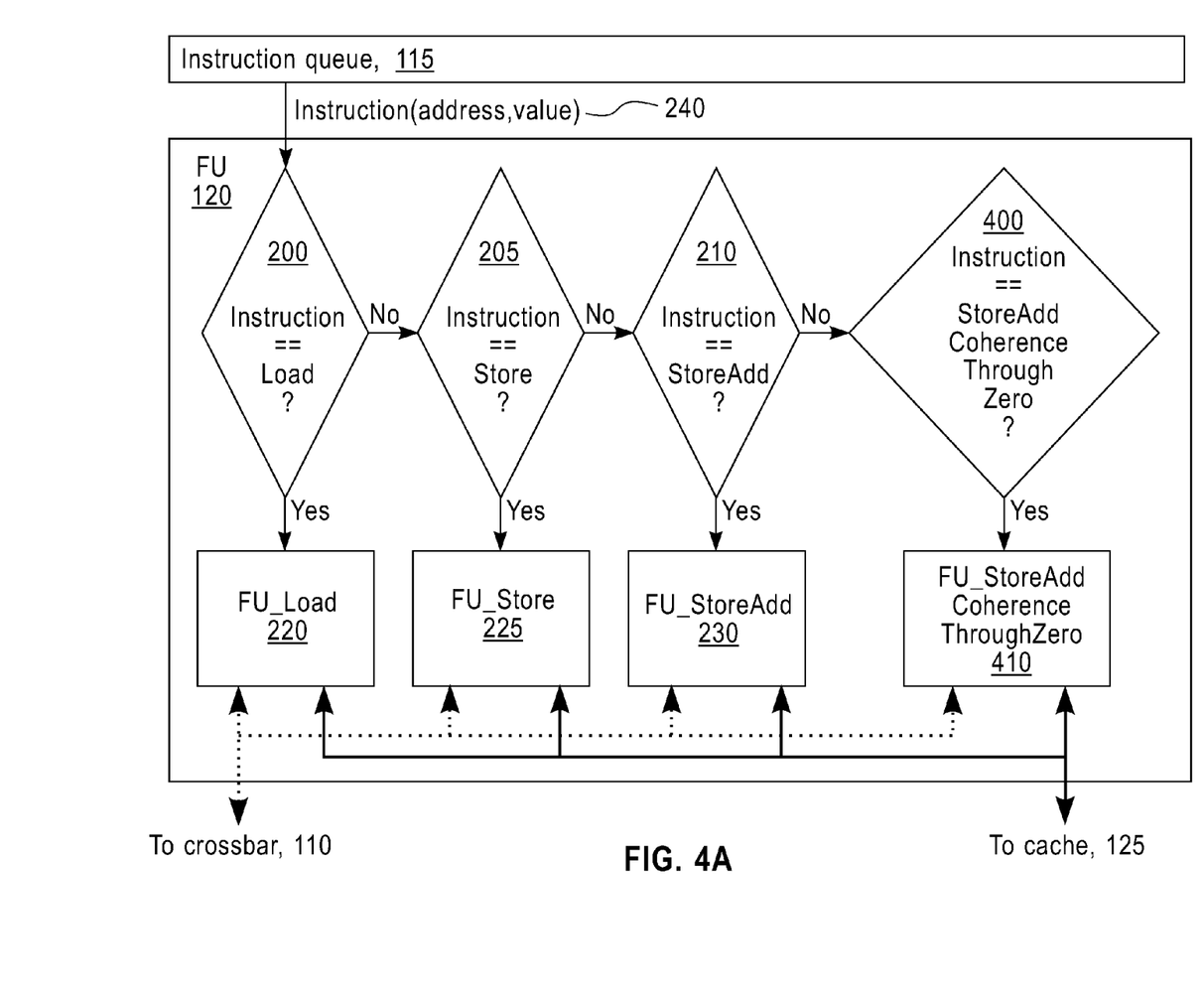
FIGS. 4A-4B illustrate a system diagram for implementing "StoreOperateCoherenceThroughZero" instruction in one embodiment.
Figure 4B:
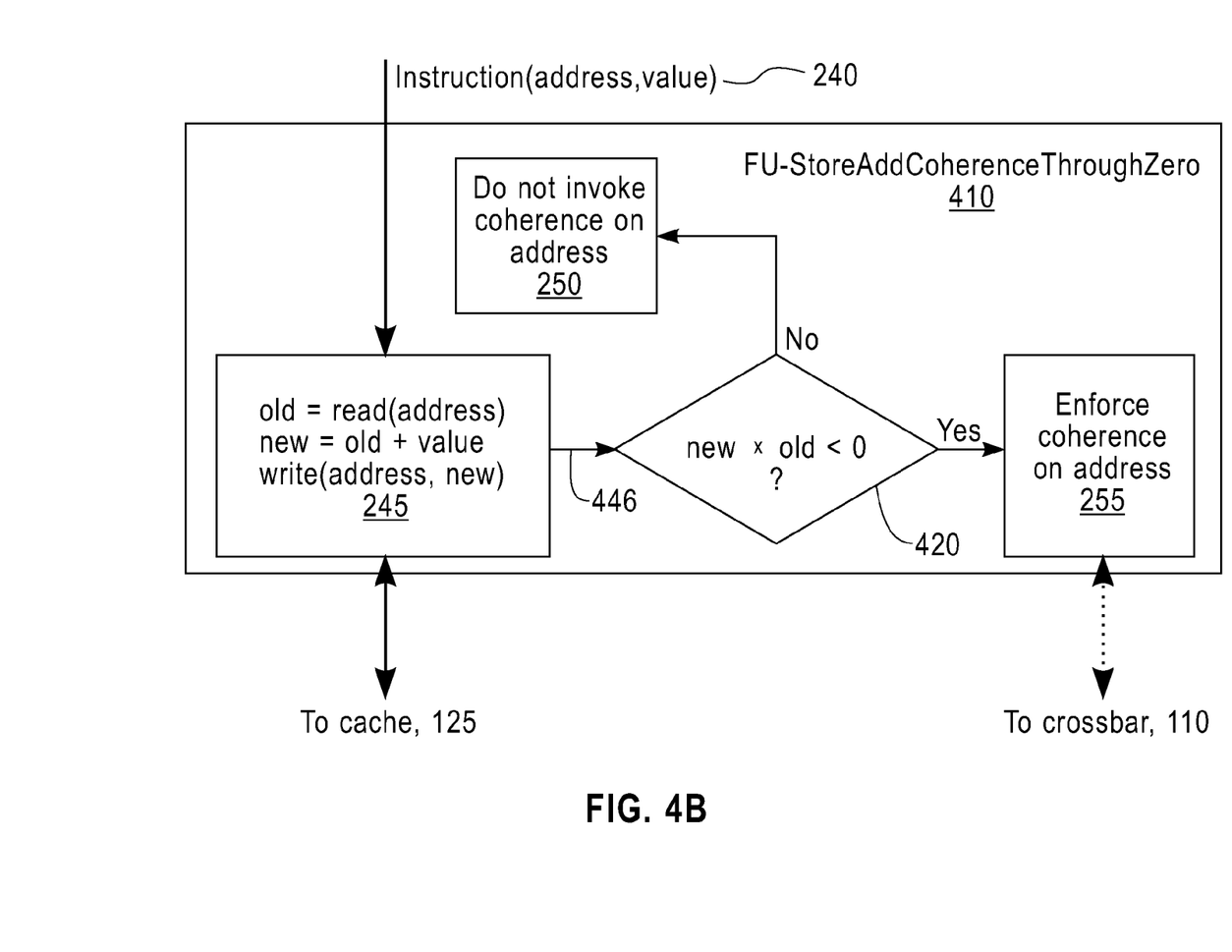

FIGS. 4A-4B illustrate operations of the FU 120 to run a StoreOperateCoherenceThroughZero instruction or FetchAndOperateCoherenceThroughZero instruction in one embodiment. FIGS. 4A-4B are similar to FIGS. 2A-2B except that the FU evaluates 400 whether the instruction 240 is the StoreOperateCoherenceThroughZero instruction or FetchAndOperateCoherenceThroughZero instruction, e.g., by checking whether the Opcode 505 of the instruction 240 indicates that the instruction 240 is a StoreOperateCoherenceThroughZero instruction. If the instruction 240 is a StoreOperateCoherenceThroughZero instruction, the FU 120 performs operations 410 which is shown in detail in FIG. 4B. The StoreOperateCoherenceThroughZero operation 410 is similar to the StoreOperateCoherenceOnValue operation 235 described above, except that the StoreOperateCoherenceThroughZero operation 410 uses a different criterion to determine whether or not to invoke a cache coherence operation on other memory devices. As shown in FIG. 4B, upon receiving from the instruction queue 115 the StoreOperateCoherenceThroughZero instruction, the FU 120 performs the store-operate operation described in the StoreOperateCoherenceThroughZero instruction. The FU 120 evaluates 420 whether a sign (e.g., positive (+) or negative (−)) of the result 446 of the store-operate is an opposite to a sign of an original value in the memory location corresponding to the logical address 510. If opposite, the FU 120 invokes 255, e.g. via cross bar 110, a cache coherence operation on other memory devices (e.g., L1 caches 165-175 in processors 135-145). Otherwise, if the result 446 does not have the opposite sign of the original value in the memory location, the FU 120 does not invoke 250 a cache coherence operation on other memory devices.

If the instruction 240 is a FetchAndOperateCoherenceThroughZero instruction, the FU 120 performs operations 410 which is shown in detail in FIG. 4B. The FetchAndOperateCoherenceThroughZero operation 410 is similar to the FetchAndOperateCoherenceOnValue operation 235 described above, except that the FetchAndOperateCoherenceThroughZero operation 410 uses a different criterion to determine whether or not to invoke a cache coherence operation on other memory devices. As shown in FIG. 4B, upon receiving from the instruction queue 115 the FetchAndOperateCoherenceThroughZero instruction, the FU 120 performs the fetch-and-operate operation described in the FetchAndOperateCoherenceThroughZero instruction. The FU 120 evaluates 420 whether a sign of the result 446 of the fetch-and-operate operation is opposite to the sign of an original value in the memory location. If opposite, the FU 120 invokes 255, e.g. via cross bar 110, a cache coherence operation on other memory devices (e.g., in processors 135-145). Otherwise, if the result 446 does not have the opposite sign of the original value in the memory location, the FU 120 does not invoke 250 a cache coherence operation on other memory devices.

In one embodiment, the store-operate operation described in the StoreOperateCoherenceOnValue or StoreOperateCoherenceOnPredecessor or StoreOperateCoherenceThroughZero includes one or more of the following traditional operations that include, but are not limited to: StoreAdd, StoreMin and StoreMax, each with variations for signed integers, unsigned integers or floating point numbers, Bitwise StoreAnd, Bitwise StoreOr, Bitwise StoreXor, etc.

In one embodiment, the Fetch-And-Operate operation described in the FetchAndOperateCoherenceOnValue or FetchAndOperateCoherenceOnPredecessor or FetchAndOperateCoherenceThroughZero includes one or more of the following traditional operations that include, but are not limited to: FetchAndIncrement, FetchAndDecrement, FetchAndClear, etc.

In one embodiment, the width of the memory location operated by the StoreOperateCoherenceOnValue or StoreOperateCoherenceOnPredecessor or StoreOperateCoherenceThroughZero or FetchAndOperateCoherenceOnValue or FetchAndOperateCoherenceOnPredecessor or FetchAndOperateCoherenceThroughZero includes, but is not limited to: 1 byte, 2 byte, 4 byte, 8 byte, 16 byte, and 32 byte, etc.

Figure 6:
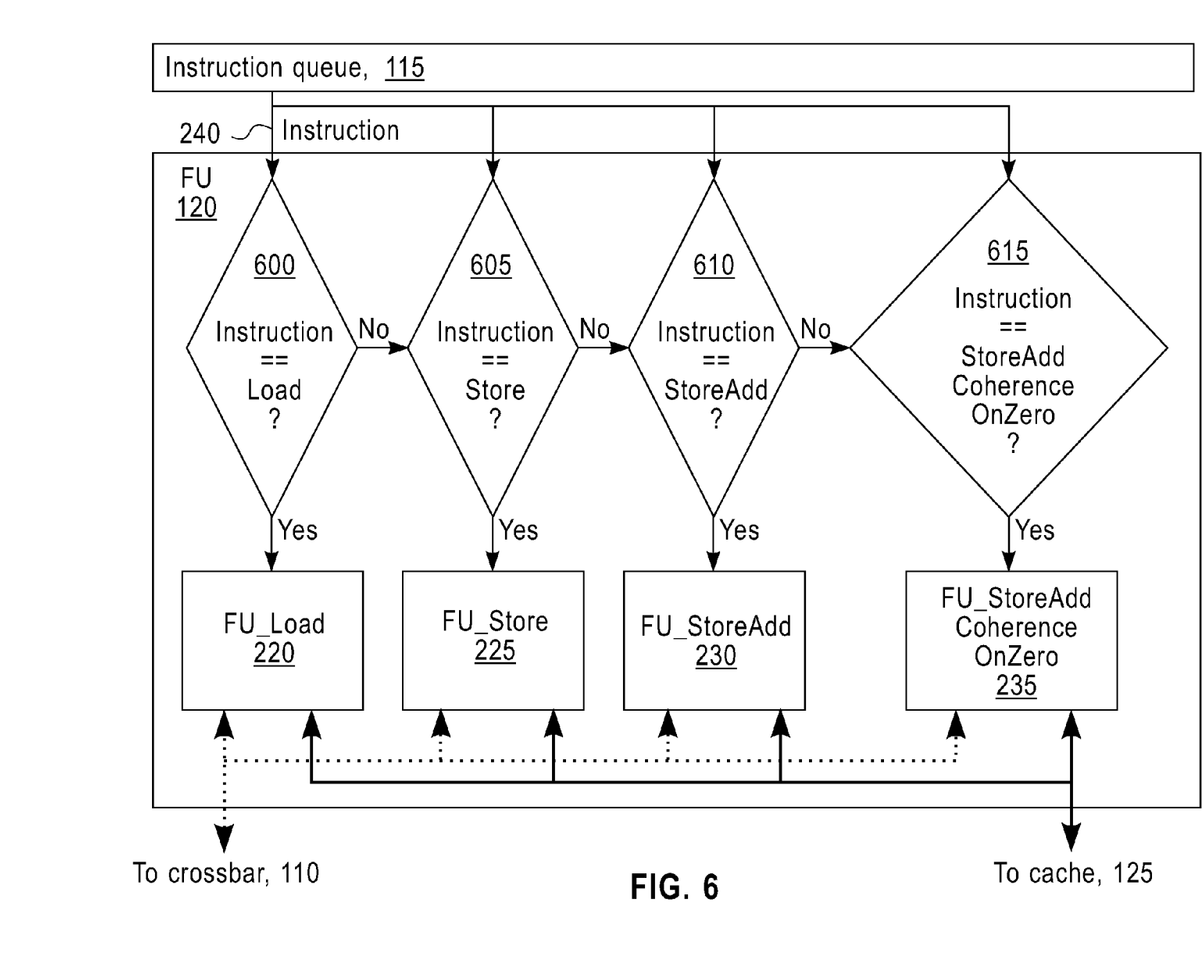
FIG. 6 illustrates a system diagram for implementing "StoreOperateCoherenceOnZero" instruction in another embodiment.

In one embodiment, the FU 120 performs the evaluations 200-215, 300 and 400 sequentially. In another embodiment, the FU 120 performs the evaluations 200-215, 300 and 400 concurrently, i.e., in parallel. For example, FIG. 6 illustrates the FU 120 performing these evaluations in parallel. The FU 120 fetches the instruction 240 from the instruction 115. The FU 120 provides the same fetched instruction 240 to comparators 600-615 (i.e., comparators that compares the Opcode 505 of the instruction 240 to a particular instruction set). In one embodiment, a comparator implements an evaluation step (e.g., the evaluation 200 shown in FIG. 2A). For example, a comparator 600 compares the Opcode 505 of the instruction 240 to a predetermined Opcode corresponding to a load instruction. In one embodiment, there are provided at least six comparators, each of which implements one of these evaluations 200-215, 300 and 400. The FU 120 operates these comparators in parallel. When a comparator finds a match between the Opcode 505 of the instruction 240 and a predetermined Opcode in an instruction set (e.g., a predetermined Opcode of StoreOperateCoherenceOnValue instruction), the FU performs the corresponding operation (e.g., the operation 235). In one embodiment, per an instruction, only a single comparator finds a match between the Opcode of that instruction and a predetermined Opcode in an instruction set.

In one embodiment, threads or processors concurrently may issue one of these instructions (e.g., StoreOperateCoherenceOnValue instruction, StoreOperateCoherenceThroughZero instruction, StoreOperateCoherenceOnPredecessor instruction, FetchAndOperateCoherenceOnValue instruction, FetchAndOperateCoherenceThroughZero instruction, FetchAndOperateCoherenceOnPredecessor instruction) to a same (cache or main) memory location. Then, the FU 120 may run these concurrently issued instructions every few processor clock cycles, e.g., in parallel or sequentially. In one embodiment, these instructions (e.g., StoreOperateCoherenceOnValue instruction, StoreOperateCoherenceThroughZero instruction, StoreOperateCoherenceOnPredecessor instruction, FetchAndOperateCoherenceOnValue instruction, FetchAndOperateCoherenceThroughZero instruction, FetchAndOperateCoherenceOnPredecessor instruction) are atomic instructions that atomically implement operations on cache lines.

In one embodiment, the FU 120 is implemented in hardware or reconfigurable hardware, e.g., FPGA (Field Programmable Gate Array) or CPLD (Complex Programmable Logic Device), e.g., by using a hardware description language (Verilog, VHDL, Handel-C, or System C). In another embodiment, the FU 120 is implemented in a semiconductor chip, e.g., ASIC (Application-Specific Integrated Circuit), e.g., by using a semi-custom design methodology, i.e., designing a chip using standard cells and a hardware description language.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for performing various store-operate instructions in a parallel computing environment that includes a plurality of processors and at least one cache memory device, the method comprising:
receiving, from a processor, a store-operate instruction that specifies a condition under which a cache coherence operation is to be invoked, said condition being a particular value that is in the received instruction from the processor, the received instruction specifying the particular value as zero;
running the received store-operate instruction to obtain a result value;
evaluating whether the result value of the running the received store-operate instruction is the particular value;
invoking a cache coherence operation on a cache memory address associated with the received store-operate instruction if the result value is the particular value; and
otherwise, not invoking the cache coherence operation on the cache memory device,
wherein the parallel computing environment includes a network in which packets are communicated out-of-order among the processors and delivered out-of-order to a network adaptor, a counter that decrements a counter value upon receiving a packet, and the network adaptor that issues a StoreAddCoherenceOnZero instruction, at least one cache memory device in responding to the issued StoreAddCoherenceOnZero instruction to perform the cache coherence operation only when the counter value becomes zero and to avoid or omit performance of the cache coherence operation on an arrival of each packet.

2. The method according to claim 1, further comprising:
issuing a FetchAndDecrementCoherenceOnZero instruction to implement a barrier which, except for a last arriving thread, does not invoke a cache coherence operation on an arrival of each thread into the barrier.

3. The method according to claim 1, wherein if the received instruction is a StoreOperateCoherenceOnPredecessor or FetchAndOperateCoherenceOnPredecessor instruction, the method further comprises:
retrieving another value, from the cache memory device, in a preceding memory location of the cache memory address corresponding the logical address;
evaluating whether the result is equal to the retrieved value;
determining that the condition is true if the result is equal to the retrieved value;
determining that the condition is false, otherwise; and
invoking the cache coherence operation only if the condition is true.

4. The method according to claim 1, wherein if the received instruction is a StoreOperateCoherenceThroughZero or FetchAndOperateCoherenceThroughZero instruction, the method further comprises:
evaluating a sign of the result and a sign of an original data value in the cache memory address;
determining that the condition is true if the sign of the result is an opposite of the sign of the original data value;
determining that the condition is false, otherwise; and
invoking the cache coherence operation only if the condition is true.

5. The method according to claim 1, wherein the received instruction is one or more of: StoreOperateCoherenceOnValue instruction, StoreOperateCoherenceOnPredecessor instruction, StoreOperateCoherenceThroughZero instruction, FetchAndOperateCoherenceOnValue instruction, FetchAndOperateCoherenceOnPredecessor instruction, and FetchAndOperateCoherenceThroughZero instruction, each received instruction further specifies one or more operations of StoreAdd, StoreMin, StoreMax, each with variations for signed integers, unsigned integers or floating point numbers, Bitwise StoreAnd, Bitwise StoreOr, Bitwise StoreXor, FetchAndIncrement, FetchAndDecrement, and FetchAndClear.

6. A system for performing various store-operate instructions in a parallel computing environment that includes a plurality of processors and at least one cache memory device, the method comprising:
a queue receiving, from a processor, a store-operate instruction that specifies a condition under which a cache coherence operation is to be invoked, said condition being a particular value that is in the received instruction from the processor, the received instruction specifying the particular value as zero;
a hardware unit fetching the received store-operate instruction from the queue, running the received store-operate instruction to obtain a result value, evaluating whether the result value of the running the received store-operate instruction is the particular value, and invoking a cache coherence operation on a cache memory address associated with the received store-operate instruction only if the result value is the particular value;
a network in which packets are communicated out-of-order among the processors and delivered out-of-order to a network adaptor;
a counter decrementing a counter value upon receiving a packet; and
the network adaptor issuing a StoreAddCoherenceOnZero instruction, at least one cache memory device in responding to the issued StoreAddCoherenceOnZero instruction to perform the cache coherence operation only when the counter value becomes zero and to otherwise avoid or omit performance of the cache coherence operation on an arrival of each packet.

7. The system according to claim 6, wherein the processor issues a FetchAndDecrementCoherenceOnZero instruction to implement a barrier which, except for a last arriving thread, does not invoke a cache coherence operation on an arrival of each thread into the barrier.

8. The system according to claim 6, wherein if the received instruction is a StoreOperateCoherenceOnPredecessor or FetchAndOperateCoherenceOnPredecessor instruction, the hardware unit is configured to:
retrieve another value, from the cache memory device, in a preceding memory location of the cache memory address corresponding the logical address;
evaluate whether the result is equal to the retrieved value;
determine that the condition is true if the result is equal to the retrieved value;
determine that the condition is false, otherwise; and
invoke the cache coherence operation only if the condition is true.

9. The system according to claim 6, wherein if the received instruction is a StoreOperateCoherenceThroughZero or FetchAndOperateCoherenceThroughZero instruction, the hardware unit is configured to:
evaluate a sign of the result and a sign of an original data value in the cache memory address;
determine that the condition is true if the sign of the result is an opposite of the sign of the original data value;
determine that the condition is false, otherwise; and invoke the cache coherence operation only if the condition is true.

10. The system according to claim 6, wherein the received instruction is one or more of: StoreOperateCoherenceOnValue instruction, StoreOperateCoherenceOnPredecessor instruction, StoreOperateCoherenceThroughZero instruction, FetchAndOperateCoherenceOnValue instruction, FetchAndOperateCoherenceOnPredecessor instruction, and FetchAndOperateCoherenceThroughZero instruction, each received instruction further specifies one or more operations of StoreAdd, StoreMin, StoreMax, each with variations for signed integers, unsigned integers or floating point numbers, Bitwise StoreAnd, Bitwise StoreOr, Bitwise StoreXor, FetchAndIncrement, FetchAndDecrement, and FetchAndClear.

11. A computer program device for performing various store-operate instructions in a parallel computing environment that includes a plurality of processors and at least one cache memory device, the computer program device comprising a storage medium, said storage medium not a propagating signal, said storage medium readable by the processors and storing instructions run by the processors for performing a method, the method comprising:

receiving, from a processor, a store-operate instruction that specifies a condition under which a cache coherence operation is to be invoked, said condition being a particular value that is in the received instruction from the processor, the received instruction specifying the particular value as zero;

running the received store-operate instruction to obtain a result value;

evaluating whether the result value of the running the received store-operate instruction is the particular value;

invoking a cache coherence operation on a cache memory address associated with the received store-operate instruction if the result value is the particular value; and otherwise, not invoking the cache coherence operation on the cache memory device, wherein the parallel computing environment includes a network in which packets are communicated out-of-order among the processors and delivered out-of-order to a network adaptor, a counter that decrements a counter value upon receiving a packet, and the network adaptor that issues a StoreAddCoherenceOnZero instruction, at least one cache memory device in responding to the issued StoreAddCoherenceOnZero instruction to perform the cache coherence operation only when the counter value becomes zero and to otherwise avoid or omit performance of the cache coherence operation on an arrival of each packet.

12. The computer program device according to claim 11, wherein the processor issues a FetchAndDecrementCoherenceOnZero instruction to implement a barrier which, except for the last arriving thread, does not invoke a cache coherence operation on an arrival of each thread into the barrier.

13. The computer program device according to claim 11, wherein if the received instruction is a StoreOperateCoherenceOnPredecessor or FetchAndOperateCoherenceOnPredecessor instruction, the method further comprises:

retrieving another value, from the cache memory device, in a preceding memory location of the cache memory address corresponding the logical address;

evaluating whether the result is equal to the retrieved value;

determining that the condition is true if the result is equal to the retrieved value;

determining that the condition is false, otherwise; and invoking the cache coherence operation only if the condition is true.

14. The computer program device according to claim 11, wherein if the received instruction is a StoreOperateCoherenceThroughZero or FetchAndOperateCoherenceThroughZero instruction, the method further comprises:

evaluating a sign of the result and a sign of an original data value in the cache memory address;

determining that the condition is true if the sign of the result is an opposite of the sign of the original data value;

determining that the condition is false, otherwise; and invoking the cache coherence operation only if the condition is true.

15. The computer program device according to claim 11, wherein the received instruction is one or more of: StoreOperateCoherenceOnValue instruction, StoreOperateCoherenceOnPredecessor instruction, StoreOperateCoherenceThroughZero instruction, FetchAndOperateCoherenceOnValue instruction, FetchAndOperateCoherenceOnPredecessor instruction, and FetchAndOperateCoherenceThroughZero instruction, each received instruction further specifies one or more operations of StoreAdd, StoreMin, StoreMax, each with variations for signed integers, unsigned integers or floating point numbers, Bitwise StoreAnd, Bitwise StoreOr, Bitwise StoreXor, FetchAndIncrement, FetchAndDecrement, and FetchAndClear.

* * * * *